US011188252B2

(12) United States Patent
Shen et al.

(10) Patent No.: US 11,188,252 B2
(45) Date of Patent: Nov. 30, 2021

(54) DATA STORAGE SYSTEM WITH ADAPTIVE CACHE MANAGEMENT

(71) Applicant: Seagate Technology LLC, Cupertino, CA (US)

(72) Inventors: Jin Quan Shen, Singapore (SG); Xiong Liu, Singapore (SG); Brian T. Edgar, Minneapolis, MN (US); Jae Ik Song, Singapore (SG)

(73) Assignee: Seagate Technology LLC ( * ) Notice: Subject to any disclaimer, the term of this patent is extended or adjusted under 35 U.S.C. 154(b) by 0 days.

(21) Appl. No.: 16/817,819

(22) Filed: Mar. 13, 2020

(65) Prior Publication Data
US 2021/0286552 A1 Sep. 16, 2021

(51) Int. Cl.
G06F 3/06 (2006.01)

(52) U.S. Cl.
CPC .......... G06F 3/0658 (2013.01); G06F 3/0608 (2013.01); G06F 3/0619 (2013.01); G06F 3/0631 (2013.01); G06F 3/0644 (2013.01); G06F 3/0659 (2013.01); G06F 3/0673 (2013.01)

(58) Field of Classification Search
CPC .... G06F 3/0658; G06F 3/0619; G06F 3/0673; G06F 3/0659; G06F 3/0644; G06F 3/0608; G06F 3/0631
See application file for complete search history.

(56) References Cited

U.S. PATENT DOCUMENTS

| 5,787,466 A | 7/1998 | Berliner |
| 6,018,789 A | 1/2000 | Sokolov et al. |
| 6,151,262 A * | 11/2000 | Haroun .................. G11C 7/16 365/227 |
| 8,341,340 B2 | 12/2012 | Rub |
| 8,402,205 B2 | 3/2013 | Goss et al. |
| 8,977,803 B2 | 3/2015 | Horn et al. |
| 9,251,052 B2 | 2/2016 | Talagala et al. |
| 9,355,036 B2 | 5/2016 | Beard et al. |
| 9,720,623 B2 | 8/2017 | Benton et al. |
| 9,959,279 B2 | 5/2018 | Archak et al. |
| 10,319,397 B2 | 6/2019 | Ryun et al. |
| 10,599,579 B2* | 3/2020 | Kumar ................ G06F 12/0848 |
| 10,733,105 B1* | 8/2020 | Visvanathan ....... G06F 11/1451 |
| 2014/0006745 A1* | 1/2014 | Fontenot ................. G06F 12/04 711/170 |
| 2014/0095793 A1* | 4/2014 | Ishikawa ............... G06F 12/084 711/123 |
| 2016/0330746 A1* | 11/2016 | Mehrabanzad ......... H04L 67/10 |
| 2019/0042458 A1* | 2/2019 | Kumar ................ G06F 12/0895 |
| 2020/0201760 A1* | 6/2020 | Desai ...................... H04L 67/02 |
| 2021/0011830 A1* | 1/2021 | Khokhar .............. G06F 9/45533 |

* cited by examiner

Primary Examiner — Sean D Rossiter
(74) Attorney, Agent, or Firm — Hall Estill Law Firm

(57) ABSTRACT

A data storage system can connect a cache memory to a caching module, a host, and a data storage device. The caching module can employ one or more local controllers to generate a caching strategy in response to detected data storage operations and execute the caching strategy to divide the cache memory into a first pool having a first size and a second pool having a second size.

20 Claims, 5 Drawing Sheets

DATA STORAGE SYSTEM WITH ADAPTIVE CACHE MANAGEMENT

SUMMARY

In accordance with some embodiments, a data storage system connects a cache memory to a caching module, a host, and a data storage device. The caching module employs a local controller to generate a caching strategy in response to detected data storage operations and execute the caching strategy to divide the cache memory into a first pool having a first size and a second pool having a second size.

A data storage system, in other embodiments, connects a cache memory to a caching module, a host, and a data storage device prior to generating a caching strategy with a local controller of the caching module in response to detected data storage operations. The caching strategy is then executed to divide the cache memory into a first pool having a first size and a second pool having a second size.

These and other features which may characterize assorted embodiments can be understood in view of the following detailed discussion and the accompanying drawings.

DETAILED DESCRIPTION

The assorted embodiments disclosed herein, without limitation, are generally directed to data storage systems that intelligently manage cache to provide optimized data storage performance and reliability.

Through the assorted embodiments, a relatively small cache that is dedicated to reducing the downstream reliability and performance impact from localized writing, such as dwell, adjacent track interference, and other repair activity that impact data storage performance, which maintains data storage reliability. When a non-volatile memory configuration is utilized, various embodiments can provide non-volatile data storage without the impacts of using the downstream non-volatile memory as a cache.

A non-limiting embodiment utilizes a compressed copy of data in volatile cache and a non-compressed copy of data in non-volatile cache. Such a compressed copy serves to be ready in a compact form for saving quickly to non-volatile memory in the event of a rude power loss and as a record of the compressed size of data so that how much remaining downstream destination capacity is available when the volatile cache is flushed or evacuated. The uncompressed copy may be convenient for sending downstream, or upstream if there is a volatile reach cache hit on the cached write data, prior to a rude power loss.

As increasing numbers of computing devices create, transfer, and store greater volumes of data, the demand for reliable data storage has continuously grown over time. Despite computing devices employing increasingly sophisticated computing components, fast data storage, and retrieval, has remained difficult. For instance, the storage of data in remoted data storage locations, such as in cloud computing environments, can be plagued by slow data writing, and/or reading, as frequent data access requests are serviced. Such slow data access request satisfaction can be contributed to static data caching and/or buffering schemes that place incoming, and outgoing, data in locations ill-configured to provide optimal data access performance.

Accordingly, embodiments of a data storage system can adapt data caching configurations to data storage conditions in a single data storage device or a distributed data storage system to provide fast and reliable servicing of data access requests. The ability to adapt data cache locations, sizes, and destinations allows for the optimization of the structure, position, and function of a cache in view of current, and predicted, data storage conditions. Utilization of an intelligent caching module to control data caching activity allows for the implementation of data compression and selective hierarchical data tiers in response to detected data storage demand and conditions to increase the robustness of data storage to rude power loss and the speed of data access request satisfaction.

Figure 1:
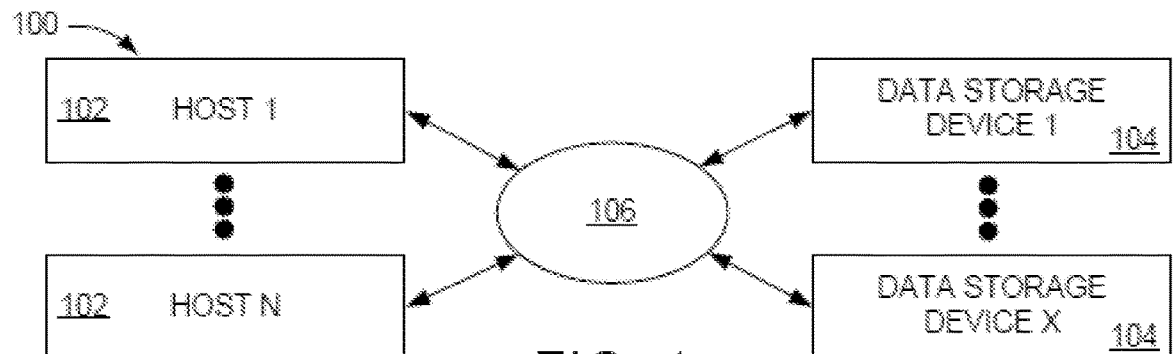
FIG. 1 is a block representation of an example data storage system configured and operated in accordance with some embodiments.

FIG. 1 depicts a block representation of an example data storage system 100 in which a number (N) of remote hosts 102 have access to a data capacity provided by a number (X) of separate data storage devices 104 via one or more network 106 connections. The data storage system 100 may be physically located in one or more physical locations. For instance, a first host 102 may be physically located in a separate country, time zone, or continent than the data storage device(s) 104 being accessed to store, or retrieve, data thanks to the wired and/or wireless interconnections of the network 106.

While the respective data storage devices 104 of the data storage system 100 can be physically located in different global regions, various embodiments congregate numerous data storage devices 104 in a single physical location, which can be characterized as a data center. Such data storage device 104 arrangement can provide efficient physical and logical management over time along with power and cooling capabilities that enjoy the economy of scale.

A block representation of an example data storage system 100 in which various embodiments can be practiced is shown in FIG. 1. The data storage system 100 can employ any number of data storage devices 102 that each has at least one local controller 122, such as a microprocessor or other programmable circuitry, that directs data storage activity to, and from, data storage media 124 via data transducing assemblies 126. It is noted that a data storage device 104 is not limited to the particular components of FIG. 1, but can utilize the aspects displayed in FIG. 1 alone, or in conjunction with other data storage devices to service data access requests from one or more remote hosts 102 connected in a distributed network 106 spanning multiple different locations, such as different cities, countries, or continents.

Figure 2:
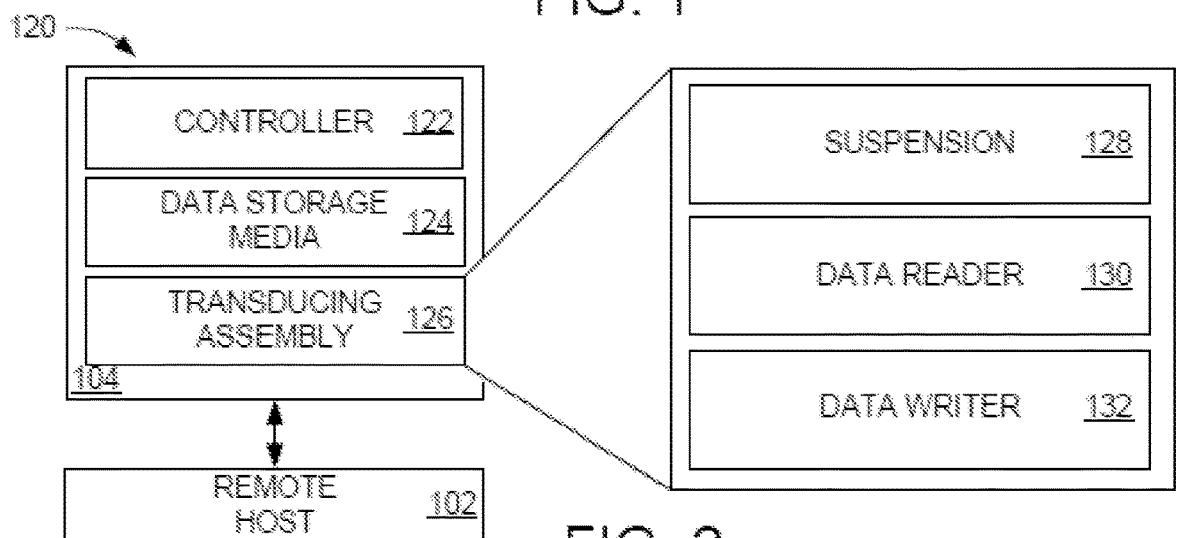
FIG. 2 displays a block representation of a portion of an example data storage system arranged in accordance with various embodiments.

FIG. 2 depicts a block representation of portions of an example data storage device 120 that can be utilized in the data storage system 100 of FIG. 1. The data storage device 120 can employ a local controller 122 that directs data access operations to, and from, one or more data storage media 124 via a corresponding transducing assembly 126. As shown, a transducing assembly 126 can consist of a suspension 128 that flies a data reader 130 and a data writer 132 a predetermined air bearing distance above a rotating data storage medium 124.

Selective activation of the data reader 130 and/or data writer 132 by the local controller 122 allows for magnetic information to be programmed to, or retrieved from, one or more sides of a data storage medium 124. It is noted that the data reader 130 and data writer 132 aspects of the data transducing assembly 126 can be packaged together on a common substrate and collectively characterized as a data transducing head.

Figure 3:
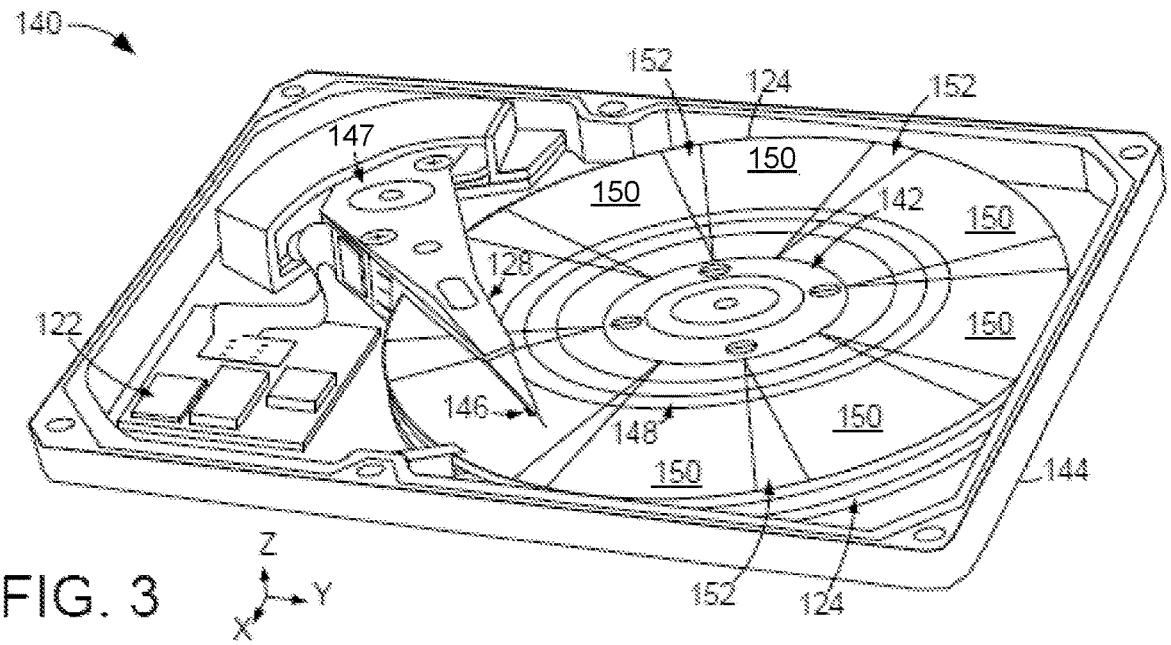
FIG. 3 depicts portions of an example data storage device capable of being used in the systems of FIGS. 1 & 2.

FIG. 3 depicts portions of an example data storage device 140 that can incorporate the aspects of the data storage device 120 of FIG. 2 and be utilized in the data storage system 100 of FIG. 1. The device 140 positions a plurality of data storage media 124 in a vertically stacked and aligned position about a spindle 142 that can selectively spin the media 124 as directed by a local controller 122 resident in a circuit board packaged in a single sealed, or unsealed, housing 144 with the media 124. The controller 122 can additionally direct operation of one or more transducing heads 146 positioned at a distal end of a suspension 128 from an actuator 147 that selectively moves the respective heads 146 over different tracks 148 spaced throughout the media 124.

The line representation of an example data track 148 depicts how magnetic portions of a data storage medium 124 can be logically divided into different zones enforced by the local controller 122. The data track 148 can have a number of user data regions 150 where end-user data is stored, and retrieved, to service data access requests from one or more remote hosts. The user data regions 150 positioned circumferentially around a data storage medium 132 can be separated by servo regions 148 where non-user generated, system data is stored and not accessible by an end user of the data storage device 140. The servo regions 148 may be arranged as radially extending wedges or continuous spirals that provide information, such as grey code, error correction, position error sensing, and data track gates, for each data track 144.

Figure 4:
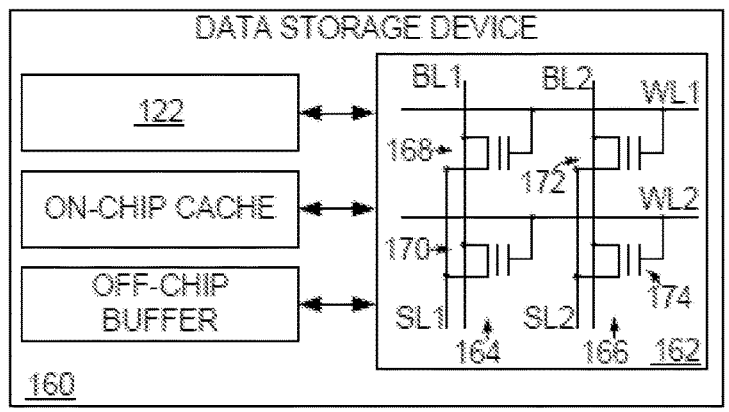
FIG. 4 illustrates portions of an example data storage device employed in accordance with assorted embodiments.

FIG. 4 depicts portions of an example data storage device 160 that can be employed in the data storage system 100 of FIG. 1 individually or collectively with the devices 120/140 of FIGS. 2 & 3. The non-limiting embodiment of FIG. 4 arranges a memory array 162 with solid-state memory cells 164 that can be utilized in a volatile, or non-volatile, configuration, such as in dynamic random access memory (DRAM), static random access memory (SRAM), phase change random access memory, resistive random access memory, or NAND flash memory.

Regardless of whether the solid state memory cells 164 are volatile or non-volatile in nature and/or configuration, a local controller, such as controller 122, can direct data writing and data reading access operations by activating circuitry 166 connecting the memory cells 164. Non-limiting circuitry 166 is partially shown schematically in FIG. 4 with first (BL1) and second (BL2) bit lines operating with first (WL1) and second (WL2) word lines and first (SL1) and second (SL2) source lines to write and read data stored in first 168, second 170, third 172, and fourth 174 memory cells.

It is noted that the respective bit lines correspond with first 176 and second 178 pages of memory that are the minimum resolution of the memory array 162. That is, the construction of the solid-state memory cells 164 prevents individual rewriting in-place and instead cells 164 are rewritable on a page-by-page basis. Such low data resolution, along with the fact that some memory cells 164, such as flash, wear out after a number of write/rewrite cycles, corresponds with numerous performance bottlenecks and operational inefficiencies compared to memory with cells 164 that are bit addressable while being individually accessible and individually rewritable in-place.

Hence, various embodiments combine solid-state memory with rotating media to provide a data storage device that can be utilized individually or as part of a distributed group of multiple data storage devices. The ability to configure solid-state and rotating magnetic memories allows for optimization of data throughput, security, and reliability by taking advantage of the different data storage capabilities of the respective memories. However, the utilization of either data storage memory can have operational issues that plague data access performance.

Figure 5:
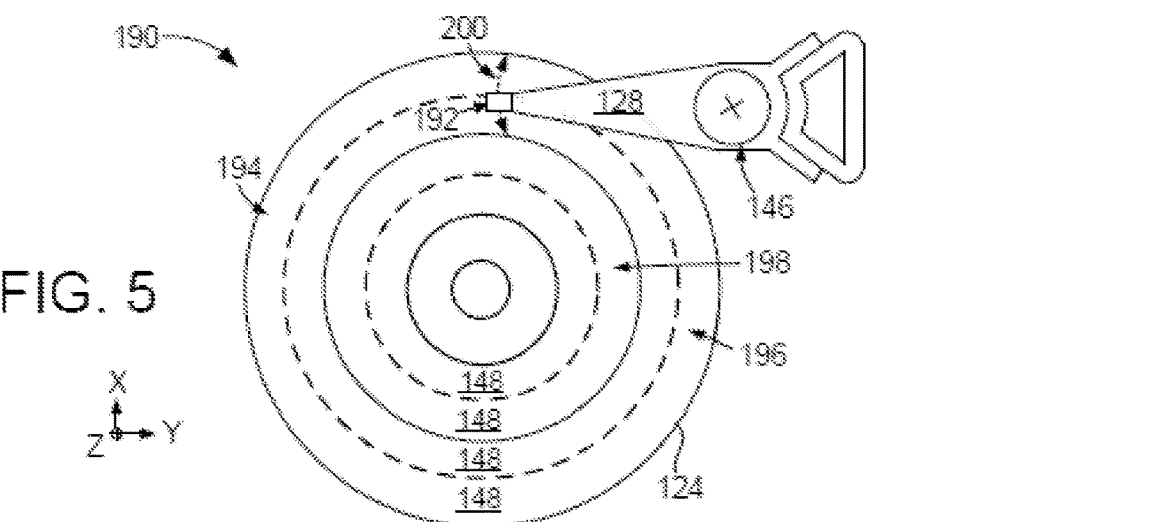
FIG. 5 depicts portions of an example data storage device configured and operated in accordance with some embodiments.

FIG. 5 depicts a line representation of portions of an example data storage device 190 employing rotating magnetic media 124. One or more transducing heads 192 can be positioned over a selected data track 148 by a suspension/arm 128 and actuator 146. The capabilities of the actuator 146 and suspension/arm 128 can provide one or more axes of movement for a head 192, which can result in fine resolution articulation and access to narrower tracks 148.

It is contemplated that a data storage surface 194 of a rotating magnetic data storage medium 124 can be segregated physically, or logically, into regions. In the non-limiting example of FIG. 5, data can be temporarily stored in an on-disk buffer region 196 prior to being stored in a destination on-disk data storage region 198. The segmentation of the storage surface 194 into different regions may further provide a reserve space that remains unused for any data storage until physical and/or logical errors occur to other portions of the storage surface 194. The use of segregated data storage regions can be utilized to segregate types of data, such as system-generated data being stored in temporary buffer regions 196 while user-generated data is temporarily and/or permanently stored in other buffer or destination regions of a storage surface 194.

The use of dedicated portions of a data storage surface 194 for temporary data storage, such as system-generated and/or user-generated data, can provide efficient hierarchical storage, and retrieval, of data. In yet, such segregation of data can maintain the transducing head 192 over a relatively tight range 200 of data tracks 148. For instance, the frequent writing of small data files involving relatively large ratio of overhead data, such as metadata, can frequently place the transducing head 192 over a select few data tracks 148 assigned for buffer and/or hierarchical data storage. Such tight transducing head 192 movement over time can be characterized as "dwell time" and can degrade the physical properties of the storage surface 194.

The effect of large dwell times on the air bearing between the storage surface 194 and the transducing head 192 can result in data storage errors and the acceleration of a data track 148 becoming unreliable and data accesses becoming slower. In contrast, the lack of segregated regions and use of random physical storage locations on a storage surface 194 for data storage can result in relatively long transducing head 192 seek times and slower data accesses. Hence, various embodiments of an adaptive cache management system selectively utilize segregated regions of a data storage surface 194 for optimized data access performance while providing reduced head dwell time.

Figure 6:
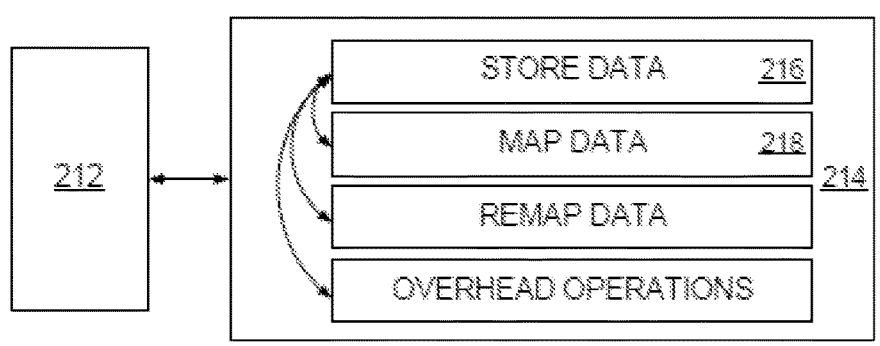
FIG. 6 conveys a block representation of portions of an example data storage device capable of being utilized in a data storage system in various embodiments.

FIG. 6 depicts a block representation of portions of an example data storage device 210 that can be employed alone, or as part of a distributed data storage system, with similar or dissimilar types of data storage. A local controller 212 can direct data storage operations to one or more solid-state memory arrays 214 that comprise volatile, or non-volatile, memory cells. As data comes into the device 210 the controller 212 can store data 216 to a physical address that corresponds to a logical address understood by the controller 212 via a mapping protocol 218.

While it is possible data may never be updated once initially written to the device 210, new versions of data are expected over time and such versions are stored 216 and mapped 220 to different physical and logical addresses, which results in the concurrent storage of old and new versions of data being present. In a memory that does not have a finite number of programming cycles before becoming unreliable, like a rotating magnetic media 124, an old version of data can be intelligently rewritten, ignored, or erased to provide high data storage capacity and performance. However, in solid-state memory that degrade in response to data being programmed/erased, old versions of data are more selectively handled via overhead operations, such as garbage collection, to reduce the number of program/erase cycles.

With operational issues like mapping, data overhead, and program/erase degradation for solid-state memory, data performance can suffer as solid-state memory is frequently utilized. In the situation where volatile solid-state memory is employed that does not suffer from program/erase degradation, data storage performance can be limited by the physical size available for volatile memory and the risk of unexpected, rude power loss that effectively wipes any stored data. Therefore, the use of volatile and/or non-volatile memory for frequent caching operations that involve data that is difficult and/or slow to reconstruct can create suboptimal data storage performance, particularly over time.

Figure 7:
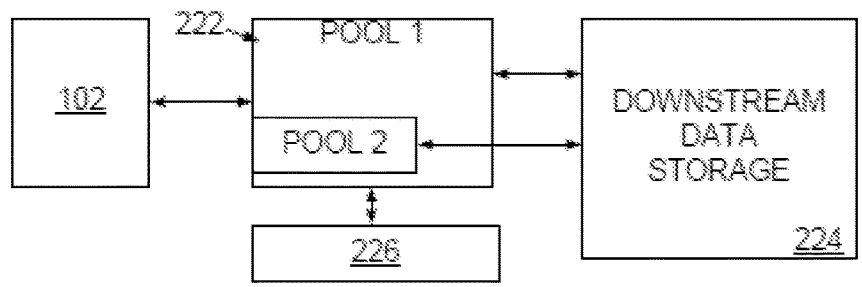
FIG. 7 shows a block representation of portions of an example data storage system configured in accordance with some embodiments.

Accordingly, assorted embodiments utilize a combination of solid-state and rotating magnetic memory that provide a variety of data storage caching options to continuously provide optimal data storage performance. FIG. 7 depicts a block representation of portions of an example data storage system 220 in which various embodiments of adaptive data caching can be practiced. The system 220 employs a memory 222 connected to at least one upstream host 102, such as a network controller or network node, and a downstream storage repository 224, such as a solid-state memory or rotating magnetic media device. The memory 222 may be controlled, at least partially, by a connected caching module 226 that comprises circuitry and hardware allowing for dynamically responding to current, and predicted, system 220 conditions by creating, altering, and deactivating portions of the memory 222.

In the non-limiting embodiment shown in FIG. 7, the memory 222 is a volatile solid-state type of data storage that is contained in a single system-on-chip (SOC). It is contemplated that the memory 222 is contained in a single die, chip, or circuit board, which allows for efficient physical placement and cooling. As such, it is contemplated that the memory 222 and caching module 226 can be incorporated into any computing component of a distributed data storage system, such as a host 102, network node, or downstream data storage device.

Figure 8:
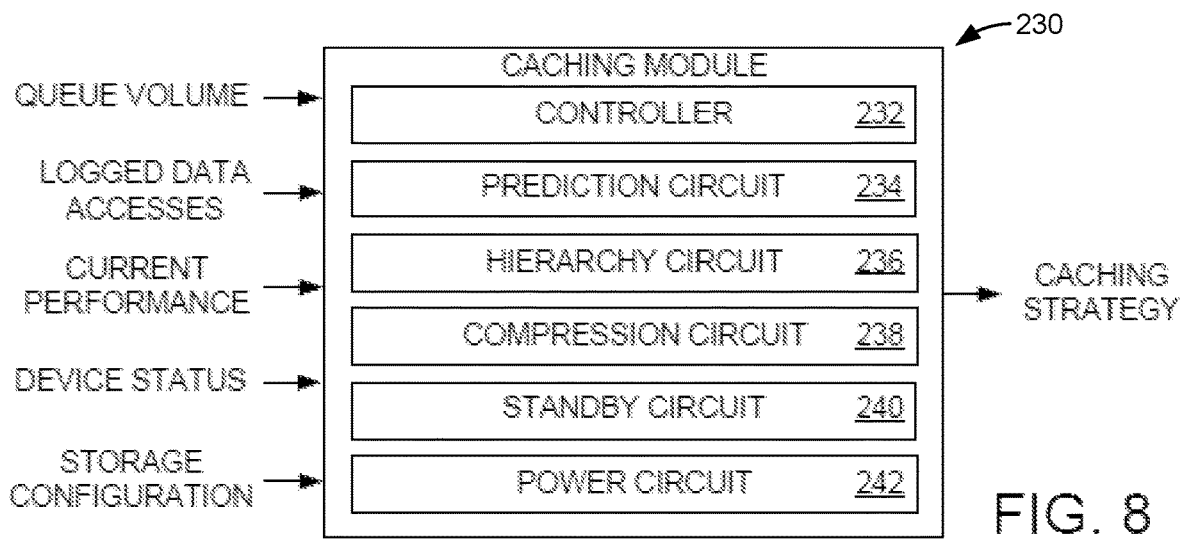
FIG. 8 depicts an example caching module that can be employed in a data storage system in accordance with assorted embodiments.

Through intelligent analysis of current data storage conditions, the caching module 226 can create, modify, and remove one or more data pools within the memory 222 to conduct data read and/or data write operations. It is noted that the respective pools are not restricted to a physical memory region and, as such, the pool size is some non-zero fraction of the volatile cache size. That is, the caching module 226 can segregate physical and logical portions of the memory 222 for various purposes to create and maintain optimal data passthrough and downstream data storage performance while providing reliability against rude power loss. FIG. 8 depicts a block representation of an example caching module 230 that can be incorporated into a data storage system to provide adaptive caching in accordance with various embodiments. The module 230 can employ one or more controllers 232 that may be resident locally, such as in the same package, SOC, or circuit board, or remotely, such as in an upstream or downstream node or device.

Regardless of the location of the module controller 232, assorted detected data storage inputs can be processed to provide one or more caching strategies. For instance, the module 230 can input various current system conditions, such as security protocol, device status, device capabilities, data access queue status, error rate, data capacity, data write latency, and data write latency, along with assorted past system conditions, such as logged data access volume, data error rate, data access latency, and cache configurations. It is contemplated that the module controller 232 can input multiple different conditions, data, and information concurrently or sequentially, as dictated by encountered system data access performance and the execution of a caching strategy.

While the module controller 232 may carry out any part of the inputting and processing of various input to generate at least one caching strategy, the module 230 may have dedicated circuitry that provides hardware configured to carry out specific tasks alone and/or in collaboration with the controller 232 to generate, modify, or carry out a caching strategy. A prediction circuit 234 can forecast future events in response to current data storage conditions. It is contemplated that the prediction circuit 234 can utilize one or more models from operating other data storage systems along with logged data storage activity from the connected data storage system to generate at least one future event, or action, that is likely to occur as a result of the current system activity, status, and condition.

The accurate forecasting of future events, such as errors, data access latency variations, and available cache volume, as well as future actions, such as garbage collection, data remapping, data being moved, data being replaced, and host-initiated data requests, allows the caching strategy to prescribe proactive adaptations of one or more cache to provide optimal data storage performance despite the occurrence of the future event and/or action. Such proactive adaptations of the caching strategy can complement one or more reactive cache adaptations prescribed by the caching strategy to provide optimal data storage performance in view of the detected current, or imminent, data storage conditions. For instance, the prediction of events/actions by the prediction circuit 234 can allow the module controller 232 to reactively set a first cache pool number and/or size to accommodate current conditions and proactively change to a second cache pool number and/or size at an opportune time to prevent, or mitigate, data storage performance degradation that could occur from the predicted events/actions.

The caching strategy, in some embodiments, configures the size of a cache pool to accommodate current, or predicted, sizes of incoming data, such as user-generated data and data overhead, like metadata and error correction code. That is, the caching strategy can set the size of a cache pool to be less than an entire page, die, or plane of memory so that incoming data fits with minimal unused memory cells. In other words, the generation of at least one smaller cache pool as a segregated region of a larger memory can be conducted in view of current, or predicted, data storage conditions so that data blocks fill the respective pages, dies, planes of memory cells instead of partially filling the smaller cache pool and inefficiently wasting cache space with unused cells of a page, die, or plane.

In a non-limiting embodiment, the caching strategy calls for a smaller cache pool to be created with a first capacity and page length that is smaller than the capacity and page length of the larger cache memory to provide faster data access latency to a downstream data storage device for current data access requests and then the small cache pool is modified to a different size and physical address range in the larger cache memory to provide reduced data storage errors, increased data security, or tighter data packing within the cache memory.

Such ability to adapt the size and position of a smaller cache within a larger cache memory provides greater flexibility and efficiency compared to the utilization of two separate memories. For example, segregating portions of a single cache memory, in accordance with the caching strategy, allows for existing data pathways, channels, and processing to be utilized in contrast to reconfiguring the use of different memories that can experience varying structural and operational parameters that take time and processing power to properly adjust. Hence, the caching strategy can segregate a range of physical addresses of a cache memory to optimally accommodate incoming, and outgoing, data between a host and a data storage device.

It is contemplated that the caching strategy calls for the segregation of one or more smaller pools within a single cache memory to accommodate particular types, sources, or sizes of data. As a non-limiting example, the caching strategy creates, or modifies, a smaller cache pool of addresses to receive, and send, data between a single remote host and one or more downstream data storage devices. In another embodiment, the caching strategy creates, or modifies, a smaller cache pool of addresses to receive, and send, data of a particular type, such as metadata or other data overhead that is not user-generated, identified by the module controller 232.

The caching strategy, in some embodiments, can set one or more thresholds for incoming data to be sorted, and smaller cache pools to be created/modified. For instance, the caching strategy may set one or more smaller cache pools and thresholds for incoming data, such as a certain data block size/length, data access frequency, data source, data destination, or security protocol associated with the data. It is contemplated that the caching module 230 evaluates the assigned logical address of incoming data to determine which cache pool to store data. As an example, data and/or a header associated with data otherwise meeting a threshold to be stored in the small cache pool can be evaluated for overlapping logical addresses with existing small pool data and overlapping logical addresses are unmarked before being stored in the small cache pool.

The created thresholds are not static and are expected to be modified by the caching module controller in response to changing data storage system structural and/or operational parameters. It is noted that the ability for a caching strategy to set and dynamically change the size/position of a small cache pool as well as the type/size/source of data entering the created small cache pool contrasts a statically created cache or buffer configuration. That is, a static cache that are either physically separate or incorporated into a single memory can become ineffective and sub-optimal in response to changing data storage conditions, such as a change in connected hosts or data storage devices or the data storage system entering a deterministic window where data read latency is prioritized over data write latency. The ability to change the actual cache pool configuration and/or the particular data entering the respective cache pools allows for superior long-term maintenance of optimal data storage performance with minimal processing, power, and system downtime.

In accordance with various embodiments, small cache pools can be created as part of a cache hierarchy configured to distribute data transfer work to multiple different cache. A hierarchy circuit 236 of the caching module 230 can evaluate, generate, execute, modify, and rescind one or more caching hierarchies as part of one or more caching strategies. It is contemplated that the hierarchy circuit 236 can create an additional caching strategy that involves numerous separate cache data storage locations that can be active concurrently, or sequentially, with another caching strategy that does not involve separate cache locations between a cache memory and a downstream destination data storage device.

With the ability to activate a secondary caching strategy concurrently, or individually, with a different caching strategy allows the caching module 230 to pivot, or supplement, data storage conditions with a diverse variety of caching schemes, parameters, and settings that can optimize data storage performance, particularly when different types and/or sizes are frequently received from different remote sources. However, it is noted that multiple caching schemes are not required and can be generated and removed by the hierarchy circuit 236 and module controller 232 in response to detected, or predicted, data storage conditions and performance at any time.

Regardless of whether a hierarchical caching structure is employed, the size of a segregated cache pool can be optimized with the intelligent compression of data executed by a compression circuit 238 of the caching module 230. That is, the compression circuit 238 can contribute to the caching strategy by prescribing when, and how, data is to be compressed. The compression circuit 238 can develop one or more different compression timings, schemes, and types so that the caching strategy efficiently and effectively compresses data while maintaining optimized data storage performance for the distributed data storage system. For example, the compression circuit 238 can prescribe different times when data is compressed or not compressed, the type of compression utilized, such as lossless or lossy compression, the degree of compression utilized, and if data is compressed at all, which allows the caching module 230, and caching strategy, to quickly and efficiently adapt to changing data storage conditions with compression settings that maintain peak data storage performance in the short-term and long-term.

The caching module 230 may further comprise a standby circuit 240 that is configured with hardware that determines how best to handle times of slow system/device activity, which can be characterized as standby time. The standby circuit 240 can prescribe one or more actions/activities for the caching strategy in response to current, and/or predicted, data storage conditions/performance to maximize the effectiveness of future standby time. As a non-limiting example, the standby circuit 240 may prescribe multiple different actions, such as garbage collection, cache memory flush, small cache pool flush, compression, or data reconstruction, for different encountered, future data storage conditions immediately preceding a device, or the entire system, entering standby time.

It is contemplated that the standby circuit 240 generates multiple different standby actions for different portions of a distributed data storage system. For example, a caching strategy may conduct garbage collection, or other data overhead operation, on a first data storage device entering standby time in response to the device experiencing a prescribed threshold activity while a small cache pool may be flushed to a separate downstream second data storage device in response to that device experiencing standby time. The ability to prescribe different standby activities for different portions of a data storage system, and/or in response to different activities immediately preceding standby time, allows the caching module 230 to quickly and efficiently identify standby time and engage in effective actions during that time, which can result in the maintenance of high data storage performance over time.

While data storage performance can be prioritized by the caching strategy and caching module 230, assorted embodiments are directed to data reliability and device/system initialization after an unexpected power loss, which may be characterized as a rude power loss. A power circuit 242 of the caching module 230 can contribute one or more power loss mitigation actions to the caching strategy in response to detected, current data storage conditions as well as future, predicted conditions. A power loss mitigation action is not limited, but may be any device, cache, or system activity that reduces the risk of data loss and/or system/device initialization time after a rude power loss. A power loss mitigation action, in accordance with some embodiments, may compress data, decompress data, move data within a memory, flush data to a separate memory, or copy data to a non-volatile memory when a rude power event occurs or is determined to be imminent.

The cooperation and individual operation of the various circuits of the caching module 230 can provide efficient processing of large volumes of data storage access activity as well as activity involved with the maintenance and security of various devices and portions of the data storage system. In contrast to a single controller/processor 232 conducting the evaluation of inputs and generation of such a sophisticated caching strategy, the use of dedicated hardware allows the caching module 230 to efficiently generate and modify a caching strategy in response to detected, and predicted, data storage conditions and performance.

Figure 9:
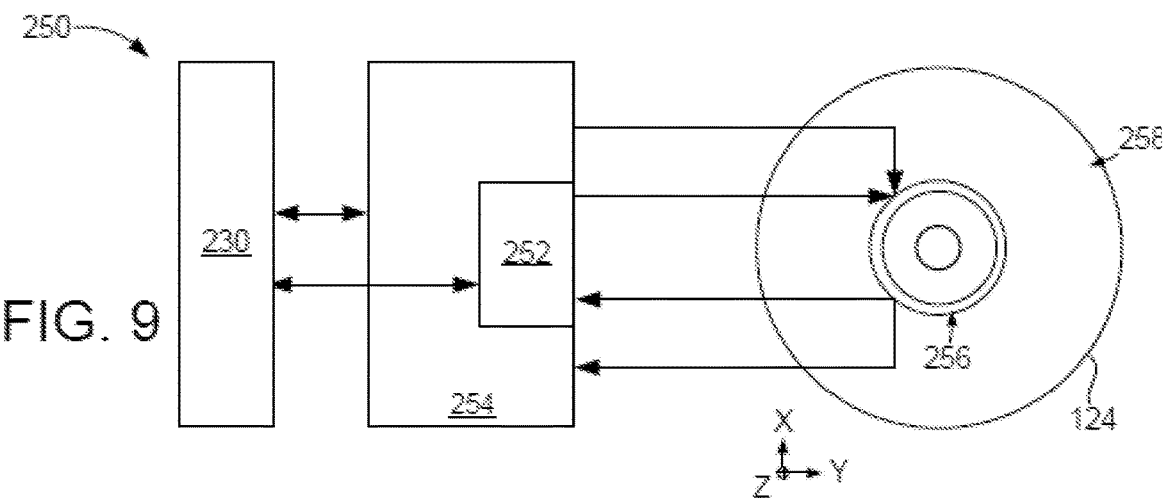
FIG. 9 displays portions of an example data storage system in which assorted embodiments can be practiced.

FIG. 9 depicts portions of an example data storage system 250 that employs a caching module 230 in accordance with assorted embodiments. The caching module 230, in execution of one or more caching strategies, can create, modify, and move a small cache pool 252 portion of a larger, segregated cache memory 254. That is, the caching module 230 can create and adapt at least one small pools 252 in response to detected, and predicted, data storage conditions that is dedicated to a particular size, type, access frequency, or other factor set by the caching strategy. As such, incoming data can be filtered by the cache module 230 into either the small pool 252 or the larger cache 254 as directed by the caching strategy.

As shown, the larger cache 254 and smaller pool 252 are each connected to at least one rotating magnetic media 124 that can be divided, logically, into a user-generated data region 256 and a system region 258. While not required, each data region 256/258 can have servo tracks, but the user-generated data region 258 is reserved for data originating from a remote host while the system region 256 is reserved for data generated by a device, module, or node of the system that is not a remote host. Under a non-limiting caching strategy, header information, and other system-generated information about data stored in either cache 252/254 can be saved to the system region 256 to remove the information from the cache 252/254 or as a redundant copy. Similarly, user-generated data stored in either cache 252/254 may be moved, or copied, to the user-generated region 258 in accordance with a caching strategy during normal distributed data storage system operation.

It is contemplated that during a standby time for the cache 252/254 and/or for the downstream data storage device 104, header information can be saved to the system region 256 to allow for efficient restoration of the user-generated data in the event of a rude power loss to the cache 252/254. Standby time, in some embodiments, can be used to parse one or more cache 252/254 of particular types of data, such as infrequently accessed data, frequently accessed data, data larger than a threshold, or data smaller than a threshold, to the user-generated region 258. It is contemplated that a caching strategy can prescribe moving user-generated data to the user-generated region 258 during a standby time while keeping header information about that data in the respective cache 252/254, which allows for efficient movement of data back to the cache 252/254 without having to recreate header information.

While normally powered operation can execute one or more caching strategies to move data between the media 124 and the cache 252/254, rude power loss can degrade data storage performance as data is rebuilt due to the volatile cache memory of the cache 252/254 losing all stored data. Hence, some embodiments of a caching strategy utilize proactive copying of header information into the system region 256 to make data reconstruction more efficient. Other embodiments proactively mitigate the effects of rude power loss by matching the size of the small cache pool 252 to the size of the system region 256, which allows for a quick flush of the entirety of the small cache pool 252 into the non-volatile system region 256 after a rude power loss is identified as imminent.

Figure 10:
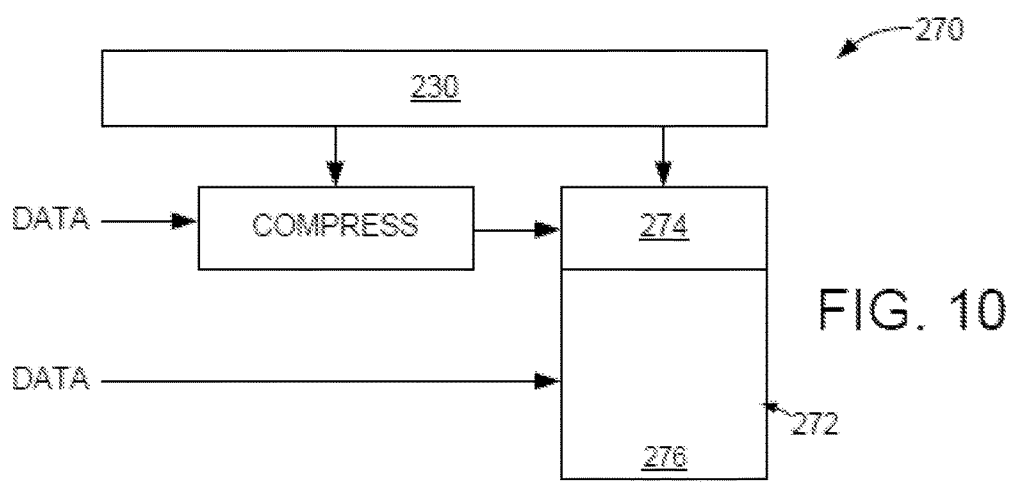
FIG. 10 illustrates portions of an example data storage system operated in accordance with some embodiments.

In FIG. 10, portions of an example data storage system 270 is depicted. The system 270 is configured and operated in accordance with various embodiments to intelligently compress data as called for by one or more caching strategies. As directed by a caching strategy generated, at least partially, by a compression circuit 238, data can be compressed prior to, or after, being stored in a cache memory 272. That is, a caching strategy can prescribe data to be stored in the cache 272 with a native size or a smaller compressed size and, in turn, move data from the cache 272 to be decompressed, compressed, or moved with a native size to a downstream data storage device or data requesting host.

The ability to selectively apply compression to some, or all, data being stored in a small cache pool 274 or larger cache reservoir 276 allows a caching strategy to efficiently utilize available system processing power and time to optimize the use of the size of the cache 272. It is noted that a caching strategy can prescribe one or more threshold data storage metrics, such as data access latency, error rate, or available capacity, that correspond with the application of a variety of compression parameters, such as algorithm, bitrate reduction, and degree. It is contemplated that the available cache 272 processing capacity is tracked to determine if, and how, data is compressed prior to entering, or after being stored in, the cache 272.

In some embodiments, a caching strategy determines the compression to be applied to data in response to the available space in an assigned cache destination 274/276. For instance, a caching module 230 can evaluate and apply what compression is needed to completely fill the small pool 274 or cache reservoir 276. The caching module 230 may, alternatively, compress data entering the cache 272 in order to completely fill a downstream hierarchical cache. As a non-limiting example, execution of a caching strategy by the caching module 230 can compress data entering the small cache pool 274 so that the pool 274, which may not be completely full itself, can be efficiently flushed to completely fill a downstream cache. Such downstream data storage compression evaluation allows for heightened data reliability in view of rude power loss as no data processing is needed to move data from the volatile cache 272 to a downstream, non-volatile data storage location.

While a caching strategy can prescribe a diverse variety of thresholds to apply different compression settings to data in response to encountered, or predicted, data storage performance/conditions, various embodiments of a caching module 230 adapt the caching strategy, and particularly the application of compression, to changing data storage conditions. For instance, a caching module 230 can identify that a current detected, or future predicted, data storage parameter remains sub-optimal after the application of the present caching strategy and adapts the caching strategy to provide optimal data storage performance for existing and future predicted conditions and parameters.

The caching module 230, in execution of a caching strategy, may employ virtual compression to provide optimized data storage. A variable may be used by the caching module 230 to monitor one or more hypothetical data sizes for at least one compression events and subsequently compare the hypothetical sizes before transferring new data to the small cache pool 274. If the variable is greater than a prescribed size, such as the size of a downstream cache or data storage location, data is directed to a different cache 276. Such virtual compression allows for efficient compression and transfer of data when a rude power loss occurs due to the data processing already being evaluated and ready for execution.

Figure 11:
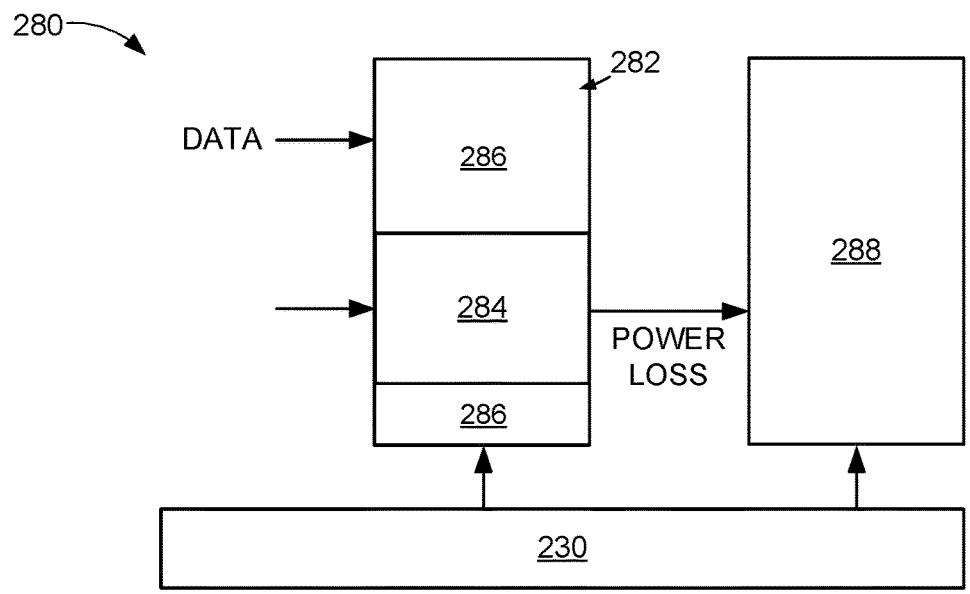
FIG. 11 represents portions of an example data storage system configured in accordance with various embodiments.

FIG. 11 depicts a block representation of portions of an example data storage system 280 that can execute one or more caching strategies in accordance with various embodiments. The system 280 may employ one or more volatile cache memories 282 that is segregated by the caching module 230 into at least two differently sized pools 284/286. Carrying out a caching strategy can store compressed, or uncompressed, data in either pool 284/286 based on detected, or predicted, data storage conditions.

At any time, the caching strategy can prescribe a destination for data stored in the cache 282 in the event of an imminent power loss. In the non-limiting example of FIG. 11, a caching strategy can assign a non-volatile solid-state memory 288 destination for data stored in at least one pool 284/286 in response to a power loss. That is, the caching module 230 can detect an unexpected power loss and utilize the remaining power to store data of at least one volatile pool 284/286 to the assigned memory 288. Some embodiments of a caching strategy prescribe multiple different destination memories for different pools, as illustrated by segmented lines.

Through the intelligent compression of data and sizing of the volatile cache pools 284/286, the caching module 230 can ensure the endurance of data stored in the volatile cache 282 despite encountering an unexpected power interruption or loss. The continuous, or sporadic, adaptation of where cached data is to be flushed upon rude power loss provides optimal data destination that corresponds with minimal time and processing power to execute upon a power loss. In other words, the caching module 230 can adapt the caching strategy, data destination, cache pool size, cache pool location, and/or compression parameters of data prior to a power loss to ensure that data can reliably be flushed to the destination in the event of a rude power loss. Such dynamic power loss analysis contrasts a static power loss data assignment that may be sub-optimal by taking too much time and/or power to reliably move data to a non-volatile memory 288 destination.

Figure 12:
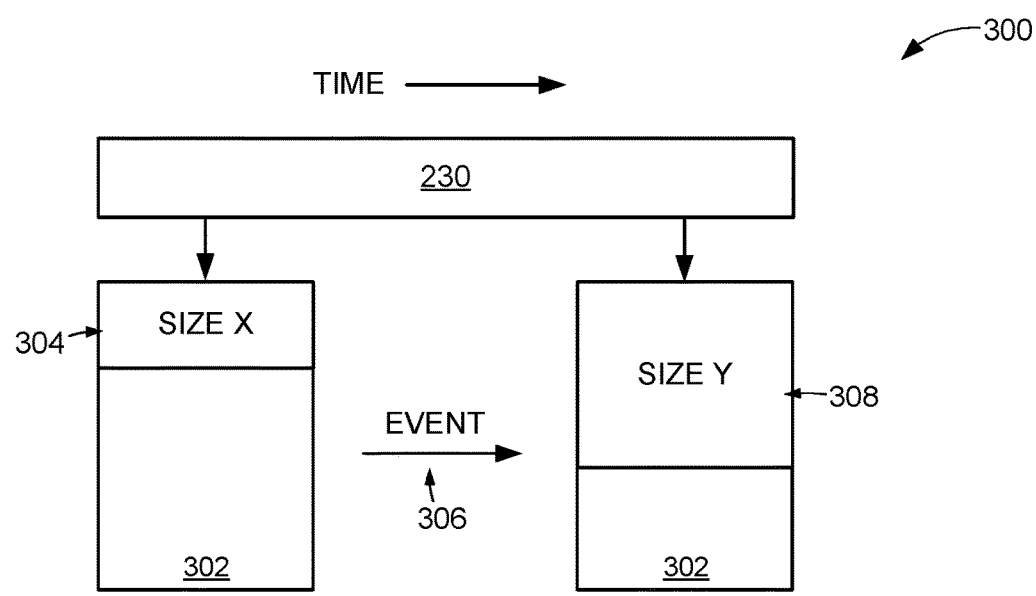
FIG. 12 conveys portions of an example data storage system that can be utilized in some embodiments.

A block representation of a portion of another example data storage system 300 is displayed in FIG. 12. In accordance with a caching strategy, a caching module 230 can change the size and/or location of portions of a volatile memory cache 302. As indicated by the passage of time arrow, a small cache pool 304 can be initially be created with a first size, as defined by a range of continuous, or discontinuous, logical data addresses. At some time after the creation of the small cache pool 304 by the caching module 230, an event 306 is detected, identified, or predicted by the caching module 230, which prompts the alteration of the size and/or location of the small cache pool 304 into an adjusted cache pool 308.

Although not required or limiting, an event 306 may be a change in the size or type of data access requests being received by the cache 302, the data access latency of the cache 302 or downstream data storage, or the data storage performance of the cache 302 or downstream data storage. Hence, the caching module 230 and executed caching strategy can be dynamically adapted to current, and predicted, data storage conditions to establish and maintain a balance of rude power loss resiliency and optimal data access latency. For instance, the caching module 230 may adapt the size of the cache pool 304 to be a factor of the size of a downstream destination so that data can efficiently be compressed, or decompressed, upon eviction from the cache 306, such as the small cache 306 being twice or four times the size of a downstream non-volatile cache, data track, data region, page, die, or plane.

Figure 13:
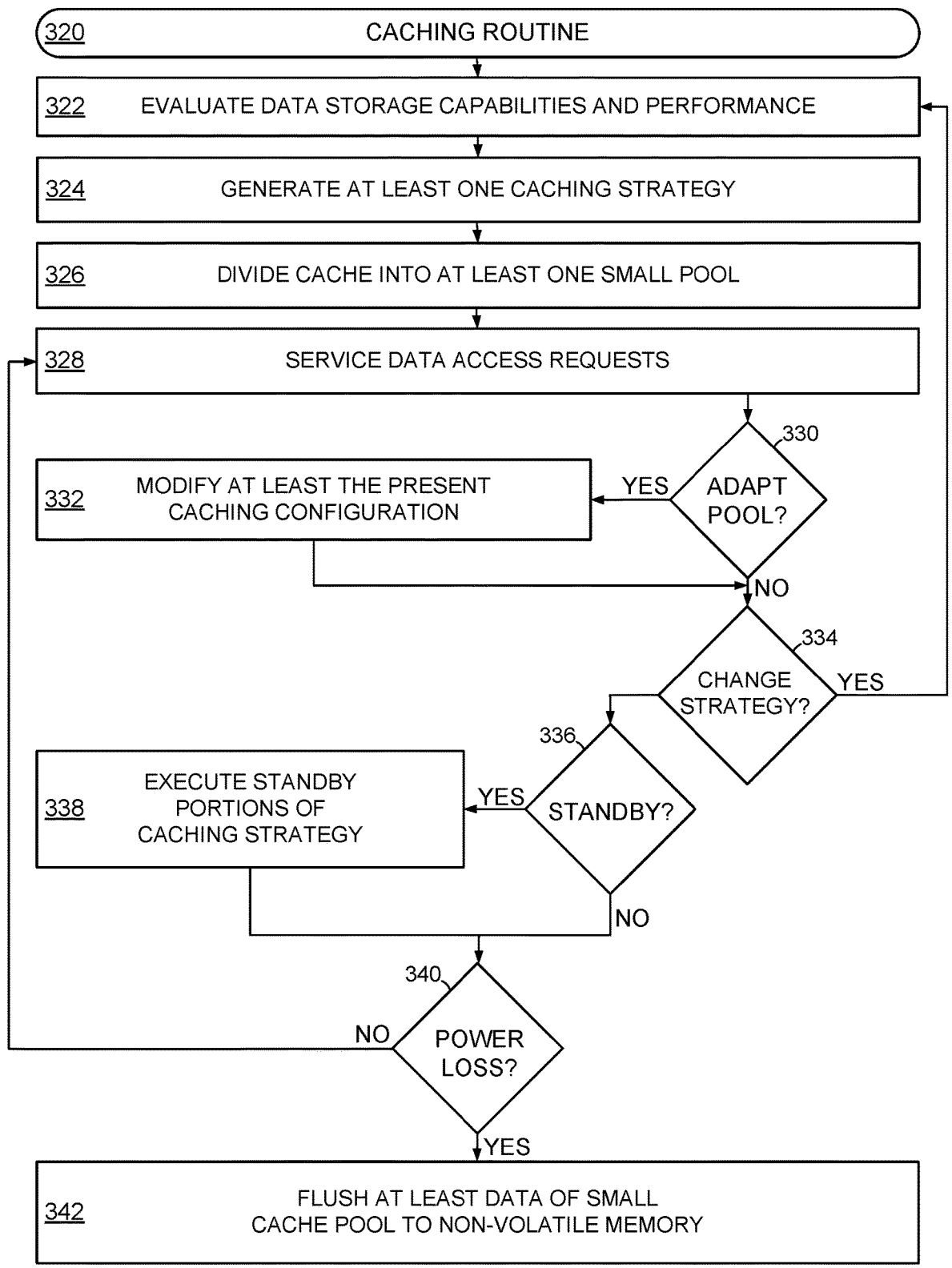
FIG. 13 is an example caching routine that can be carried out with the assorted embodiments conveyed in FIGS. 1-12.

The assorted embodiments of a data storage system conveyed in FIGS. 1-12 can be utilized to perform the example caching routine 320 of FIG. 13. The non-limiting routine 320 may begin with step 322 evaluating the data storage capabilities of one or more components connected as part of a distributed data storage system. The evaluation of step 322 may involve logging the satisfaction of user-generated data access requests and/or test patterns generated by a caching module connected to the system. It is noted that an initial caching scheme may be in place during step 322.

Based on the evaluated data storage performance and conditions from step 322, one or more caching strategies can be generated in step 324 by the caching module. Step 324 may involve the prediction of one or more events, activities, or data storage performance metrics that are accommodated by at least one reactive cache alteration. It is contemplated that a caching strategy from step 324 can prescribe one or more proactive system alterations in response to a variety of different encountered, and predicted, data access request activity and/or data storage performance.

Next, step 326 executes at least a portion of a generated caching strategy by creating a segregated cache pool portion of a larger cache. The created small cache pool can be assigned to particular data, such as by type, size, source, or destination. For instance, data access requests having a size within a range defined by the caching strategy can be stored in the small cache pool. Alternatively, data having a predetermined security status may be stored in the small cache pool. As another example, data identified, or predicted, as frequently accessed data, such as metadata or data from a particular source, may be directed to small cache pool storage. It is noted that the caching module may alter the data associated with an incoming data access request to manipulate what cache is utilized, which can level-load the capacity and performance of multiple volatile caches.

In some embodiments, step 326 can involve the proactive alteration of existing data storage and/or caching parameters. For example, a hierarchical caching structure can be created or modified to better accommodate actual, or expected, data. The created caching structure and scheme from step 326 is then utilized in step 328 to satisfy one or more host data access requests. While step 328 can be conducted any number of times to satisfy any number of data access requests from any number of remote hosts, decision 330 evaluates if the data storage conditions, performance, or structure has changed as prescribed by the caching strategy. If so, step 332 proceeds to modify at least the caching configuration in accordance with the caching strategy to provide optimal data storage performance. For instance, step 332 may alter the size, location, compression, or storage parameters of the small cache pool.

In the event no cache adaptation is called for, or after step 332 alters a portion of a caching configuration, decision 334 determines if the caching strategy is to be altered. Decision 334 can evaluate current data storage conditions, such as error rate, data access latency, cache capacity, and security protocol, along with data storage structure, such as number and type of connected hosts, downstream data storage devices, volatile cache destinations, and non-volatile cache. Regardless of the triggering operating and/or structural condition that prompts revision of a caching strategy, routine 320 proceeds back to step 322 where at least some of the data storage system is monitored and/or tested to generate new caching strategy thresholds, parameters, timing, proactive actions, or reactive actions.

During nominal operation of the data storage system with at least one caching strategy, decision 336 can determine if portions of the system are in a standby mode. If so, step 338 can execute the portions of the caching strategy associated with standby time, such as data moving, cache size/position modification, data compression, or hierarchical cache creation/modification. Whether in standby mode or nominal operation, decision 340 can determine if a rude power loss is imminent or predicted, which prompts step 342 to flush at least the data of the small cache pool into a non-volatile location. It is noted that the flushing of data in step 342 can be reliable and efficient due to the execution of the caching strategy that maintains the small cache pool size, position, compression, and data parameters so that no processing of data is required for the data to be flushed to non-volatile memory cells.

Through the various embodiments of routine 320 and the data storage systems of FIGS. 1-12, volatile cache can be effectively divided, which can allow for a repository for frequently accessed and/or small blocks of data. Some embodiments of a caching strategy prescribe the removal of a small cache pool in response to detected data storage conditions, which ensures efficient use of the finite amount of volatile cache. An intelligent caching module can reorganize the data, cache, or both to provide optimal resiliency to rude power loss or optimal data storage performance in the form of reduced data access latency. It is contemplated that some caching strategies provide a balance of rude power loss resiliency and data access latency by configuring at least one small cache pool with respect to a compression scheme and downstream data flush destination to provide less-than-best data access latency in combination with guaranteed data retention after a rude power loss.

The robust sophistication of a caching strategy can store data to avoid dwell times for downstream data storage devices. The avoidance of frequent media accesses can reduce seek times and the overall size requirement when caching compression is employed. While rude power loss may be handled with compression, a caching strategy may reduce the time associate with saving data to a non-volatile destination by performing some, or all, data processing, such as metadata updates, error correction, or compression, prior to being stored in the small cache pool. The selective use of compression, such as just for metadata while user-generated data is not compressed, allows for parallel cache pool utilization and reduced data access latencies.

What is claimed is:

1. A system comprising a cache memory connected to a caching module, a host, and a data storage device, the caching module comprising a local controller to generate a caching strategy in response to detected data storage operations and execute the caching strategy to divide the cache memory into a first pool having a first size and a second pool having a second size, the second size being different than the first size, the first pool restricted to a first type of data and the second pool restricted to a second type of data in accordance with the caching strategy, the first type of data being different than the second type of data, the second size and the second type of data respectively based on predicted change in a number of connected hosts.

2. The system of claim 1, wherein the caching module comprises a prediction circuit to forecast at least one future data storage activity for the caching strategy.

3. The system of claim 1, wherein the caching module comprises a hierarchy circuit to prescribe a plurality of separate cache data locations between the host and data storage device for the caching strategy.

4. The system of claim 1, wherein the caching module comprises a compression circuit to generate a compression scheme for the caching strategy.

5. The system of claim 1, wherein the caching module comprises a standby circuit to identify standby time and optimal data storage activity during the standby time for the caching strategy.

6. The system of claim 1, wherein the caching module comprises a power circuit to preserve data stored in the cache memory in response to an identified inadvertent power loss.

7. The system of claim 1, wherein the cache memory comprises volatile memory cells.

8. The system of claim 1, wherein the data storage device comprises a rotating magnetic data storage medium.

9. The system of claim 1, wherein the data storage device comprises non-volatile solid-state memory cells.

10. A method comprising:
connecting a cache memory to a caching module, a host, and a data storage device;
generating a caching strategy with a local controller of the caching module in response to detected data storage operations, the caching strategy prescribing a compression scheme to selectively compress data prior to being stored in the cache memory; and
executing the caching strategy to divide the cache memory into a first pool having a first size and a second pool having a second size each pertaining to the detected data storage operations, the caching strategy compresses data virtually prior to storing the data in the second pool in response to the compressed data not fitting within a downstream non-volatile cache.

11. The method of claim 10, wherein the caching strategy prescribes altering the first size of the first pool to a different third size.

12. The method of claim 11, wherein the third size matches a fourth size of a system data region of the data storage device.

13. The method of claim 11, wherein the third size is less than the second size.

14. The method of claim 11, wherein the third size is a multiple of the first size of the first pool of the cache memory, the multiple assigned by the caching strategy in response to a compression scheme.

15. The method of claim 10, wherein the first pool is assigned to store data having a size less than a threshold prescribed by the caching strategy.

16. The method of claim 10, wherein the first pool is assigned to store data having a predicted access frequency greater than a threshold prescribed by the caching strategy.

17. The method of claim 10, wherein the caching strategy compresses data identified as fitting within a downstream non-volatile cache once compressed.

18. The method of claim 10, wherein the caching strategy compresses data virtually prior to storing the data in the second pool in response to the compressed data not fitting within a downstream non-volatile cache.

19. A method comprising:
connecting a cache memory to a caching module, a host, and a data storage device;
generating a caching strategy with a local controller of the caching module in response to detected data storage operations; and
altering a first type of data received by the cache memory to a second type of data, as directed by the caching strategy, in response to entering a deterministic window, the second type of data being a threshold data block size.

20. The method of claim 19, wherein the caching module predicts entering the deterministic window and alters the type of data received by the cache memory in response to said prediction.

* * * * *